United States Patent
Thomas et al.

(10) Patent No.: US 11,104,276 B2
(45) Date of Patent: Aug. 31, 2021

(54) VEHICLE CONSOLE ASSEMBLY HAVING AN INTEGRATED MOUNTING STRUCTURE

(71) Applicant: Ford Global Technologies, LLC, Dearborn, MI (US)

(72) Inventors: Gregory Paul Thomas, Canton, MI (US); Stephen Neal Jacobsen, Plymouth, MI (US); Michele Marie Mathews, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 157 days.

(21) Appl. No.: 16/687,830

(22) Filed: Nov. 19, 2019

(65) Prior Publication Data

US 2021/0146846 A1    May 20, 2021

(51) Int. Cl.
*B60R 7/04*    (2006.01)

(52) U.S. Cl.
CPC ..................... *B60R 7/04* (2013.01)

(58) Field of Classification Search
CPC .................................. B60R 7/04; B60N 2/75
USPC ..................... 296/24.34, 37.8, 1.09
See application file for complete search history.

(56) References Cited

U.S. PATENT DOCUMENTS

| | | | | |
|---|---|---|---|---|
| 6,033,015 A * | 3/2000 | Husted | ........... | B60N 2/793 297/188.19 |
| 6,851,736 B1 * | 2/2005 | Klopp, III | ........... | B60R 7/04 224/926 |
| 8,046,875 B2 * | 11/2011 | Wang | ........... | F16M 11/10 16/338 |
| 9,243,434 B2 * | 1/2016 | Koarai | ........... | E05D 11/087 |
| 10,071,662 B2 * | 9/2018 | Choi | ........... | E05F 1/1223 |
| 10,352,076 B2 * | 7/2019 | Selvakumar | ........... | B60N 2/753 |
| 2009/0106938 A1 * | 4/2009 | Mori | ........... | E05F 1/1215 16/277 |
| 2012/0074726 A1 * | 3/2012 | Takai | ........... | B60R 7/04 296/24.34 |
| 2015/0267451 A1 * | 9/2015 | Hirai | ........... | E05D 11/08 16/279 |
| 2016/0052429 A1 * | 2/2016 | Hessdorfer | ........... | B60N 2/753 297/411.32 |
| 2017/0334323 A1 * | 11/2017 | Stuiber | ........... | B60N 2/767 |
| 2018/0304788 A1 * | 10/2018 | Park | ........... | B60N 2/75 |
| 2019/0184876 A1 * | 6/2019 | Mullen | ........... | B60R 7/04 |

FOREIGN PATENT DOCUMENTS

| | | | |
|---|---|---|---|
| JP | 3203949 B2 | 11/1995 |
| JP | 60714772 B2 | 6/2014 |

\* cited by examiner

*Primary Examiner* — D Glenn Dayoan
*Assistant Examiner* — E Turner Hicks
(74) *Attorney, Agent, or Firm* — David Coppiellie; Price Heneveld LLP

(57) ABSTRACT

A vehicle floor console assembly includes a console body including a bin integrally formed with the console body, and a support structure integrally formed with the console body and extending from a rear wall of the bin. The support structure includes a support hinge knuckle. The vehicle floor console assembly further includes a lid including a lid hinge knuckle rotatably coupled to the support hinge knuckle, and an end panel coupled to the support structure. A front portion of the end panel together with the console body defines an end panel interface. The end panel interface is substantially flush with the rear wall of the bin.

18 Claims, 12 Drawing Sheets

VEHICLE CONSOLE ASSEMBLY HAVING AN INTEGRATED MOUNTING STRUCTURE

FIELD OF THE DISCLOSURE

The present disclosure generally relates to a console assembly. More specifically, the present disclosure relates to a vehicle center console assembly.

BACKGROUND OF THE DISCLOSURE

Vehicles often have center consoles, including an armrest lid that allows occupants within the vehicles to rest their arms and access a bin of the center console. The armrest lid is typically coupled to the console bin by a hinge assembly. In this way, the armrest lid is operable between opened and closed positions.

SUMMARY OF THE DISCLOSURE

According to a first aspect of the present disclosure, a vehicle floor console assembly includes a console body, a bin integrally formed with the console body, and a support structure integrally formed with the console body and extending from a rear wall of the bin. The support structure includes a support hinge knuckle, an end panel attachment feature, and a floor attachment feature.

Embodiments of the first aspect of the present disclosure can include any one or a combination of the following features:
- a lid comprising a lid hinge and a lid hinge knuckle wherein the lid hinge knuckle is rotatably coupled to the support hinge knuckle;
- the lid hinge comprises an arcuate shape wherein the lid hinge comprises a stop protruding radially outward from an edge of the hinge;
- the console body further comprises an abutment integrally formed with the console and extending from a rear wall of the bin configured to contact the stop of the lid hinge when the lid is in a fully opened position;
- further comprising an end panel coupled to the end panel attachment feature;
- a front portion of the end panel and the console body define an end panel interface, wherein the end panel interface is substantially flush with a rear wall of the bin;
- a floor bracket wherein the floor bracket is coupled to the floor attachment feature and a floor panel of a vehicle;
- the floor bracket comprises a U-shape and together with a bottom surface of the bin defines a lower space;
- the lower space is sized to receive an HVAC duct; and
- the console body comprises one or more inwardly extending side edges configured to fit within downwardly extending side edges of the lid.

According to a second aspect of the present disclosure, a vehicle floor console assembly includes a console body. The console body includes a bin integrally formed with the console body, and a support structure integrally formed with the console body and extending from a rear wall of the bin. The support structure includes a support hinge knuckle. The vehicle floor console assembly further includes a lid including a lid hinge knuckle rotatably coupled to the support hinge knuckle, and an end panel coupled to the support structure. A front portion of the end panel, together with the console body, defines an end panel interface. The end panel interface is substantially flush with the rear wall of the bin.

Embodiments of the second aspect of the present disclosure can include any one or a combination of the following features:
- the lid comprises a lid hinge having an arcuate shape, wherein the lid hinge comprises a stop protruding radially outward from an edge of the hinge;
- the console body further comprises an abutment integrally formed with the console and extending from a rear wall of the console configured to contact the stop of the lid hinge when the lid is in a fully opened position;
- further comprising a floor bracket wherein the floor bracket is coupled to the floor attachment feature and a floor panel of a vehicle; and
- the floor bracket comprises a U-shape and together with a bottom surface of the bin defines a lower space, wherein the lower space sized to receive an HVAC duct.

According to a third aspect of the present disclosure, a method for manufacturing a vehicle floor console assembly includes providing an injection molding apparatus including a driver-side mold part, a passenger-side mold part, and a rear mold part. The method further includes injecting a plastic resin into the injection molding apparatus to form an integral console body including an integrally formed bin and an integrally formed support structure. The driver-side cross-car tooling apparatus, the passenger-side cross-car apparatus, and the rearward tooling apparatus together define the support structure extending from a rear wall of the bin. The method further includes removing the integral console body from the injection molding apparatus.

Embodiments of the third aspect of the present disclosure can include any one or a combination of the following features:
- the support structure comprises a support hinge knuckle, an end panel attachment feature, and a floor attachment feature;
- further comprising providing a lid comprising a lid hinge and a lid hinge knuckle, and coupling the lid hinge knuckle to the support hinge knuckle;
- further comprising coupling an end panel to the end panel attachment feature; and
- further comprising coupling the floor attachment feature of the support structure to a floor pan of a vehicle.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
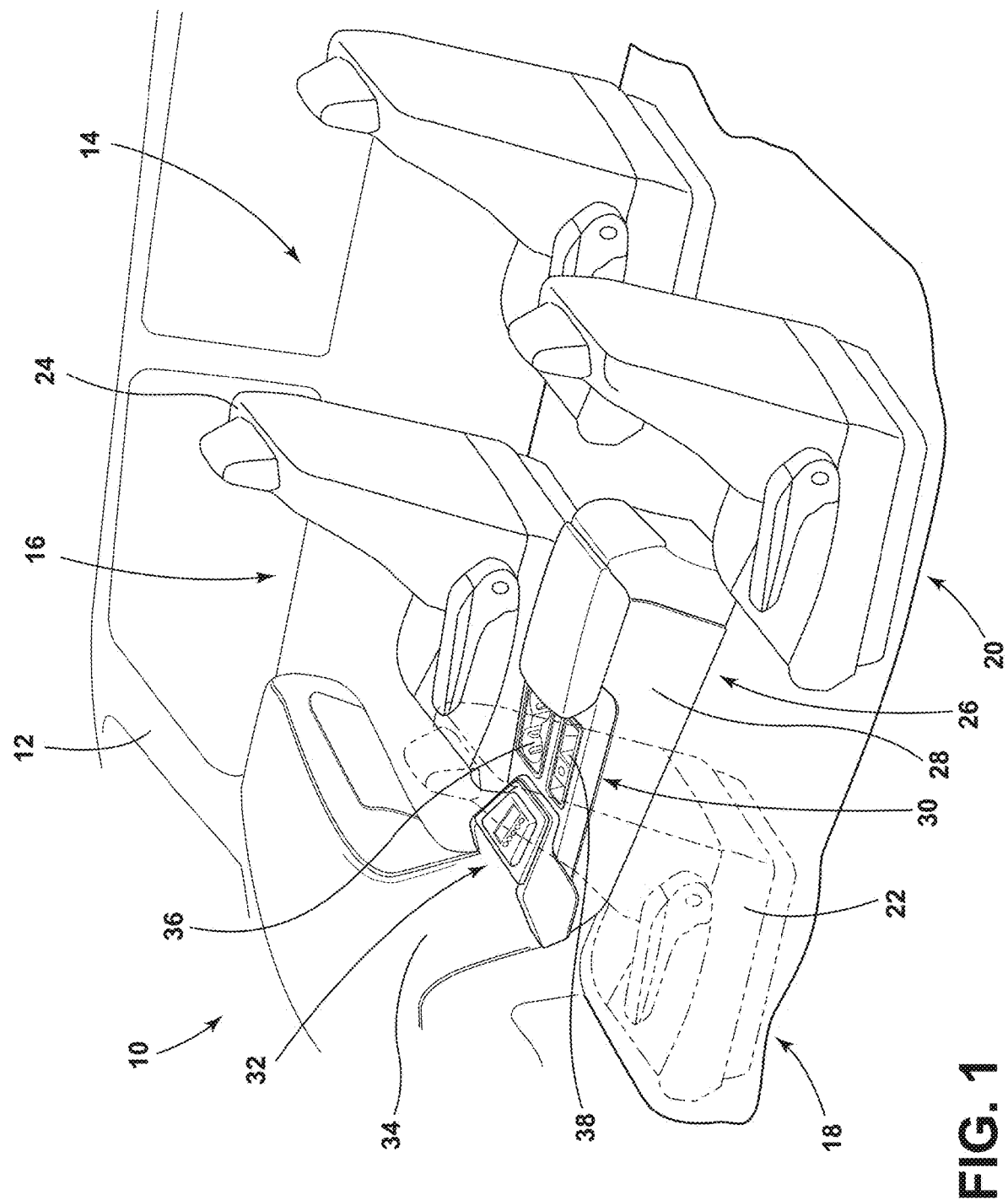
FIG. 1 is a perspective view of a passenger compartment of a vehicle having a vehicle console assembly.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIG. 1, a vehicle 10 is generally illustrated having a vehicle body 12, which defines an interior 14 of the vehicle 10 having a passenger compartment 16 therein. The passenger compartment 16 may include a first seating row 18 and a second seating row 20. Fewer or more seating rows may be included in the vehicle 10 without departing from the teachings herein. The first seating row 18 may include a driver seat 22 and a passenger seat 24. The driver and passenger seats 22, 24 may be separated by a console assembly 26. The console assembly 26 may include a console body 28, a cup holder assembly 30, and a shifter assembly 32. The cup holder assembly 30 and shifter assembly 32 may extend between the console body 28 and an instrument panel 34 of the vehicle 10. The cup holder assembly 30 may define one or more cup wells 36 and/or one or more receiving wells 38 for receiving other objects, such as electronics, keys, etc. The cup holder assembly 30 may also define one or more apertures for receiving various controls for the vehicle 10.

While the vehicle 10, as illustrated in FIG. 1, has the console assembly 26 between the driver seat 22 and the passenger seat 24 of the first seating row 18, it is contemplated that the console assembly 26 may be positioned in any practicable location within the passenger compartment 16 of the vehicle 10 without departing from the teachings herein. Additionally or alternatively, the console assembly 26 is illustrated as a center console. However, the console assembly 26 may be any console or compartment within the vehicle 10 without departing the teachings herein.

In various examples, the vehicle 10 is a wheeled motor vehicle, which may be a sedan, a sport utility vehicle, a truck, a van, a crossover, and/or other styles of the vehicle 10. The vehicle 10 may be a manually operated vehicle (e.g., with a human driver), a fully autonomous vehicle (e.g., no human driver), or a partially autonomous vehicle (e.g., may be operated with or without a human driver). Additionally, the vehicle 10 may be utilized for personal and/or commercial purposes, such as ride-providing services (e.g., chauffeuring) and/or ride-sharing services.

Figure 2:
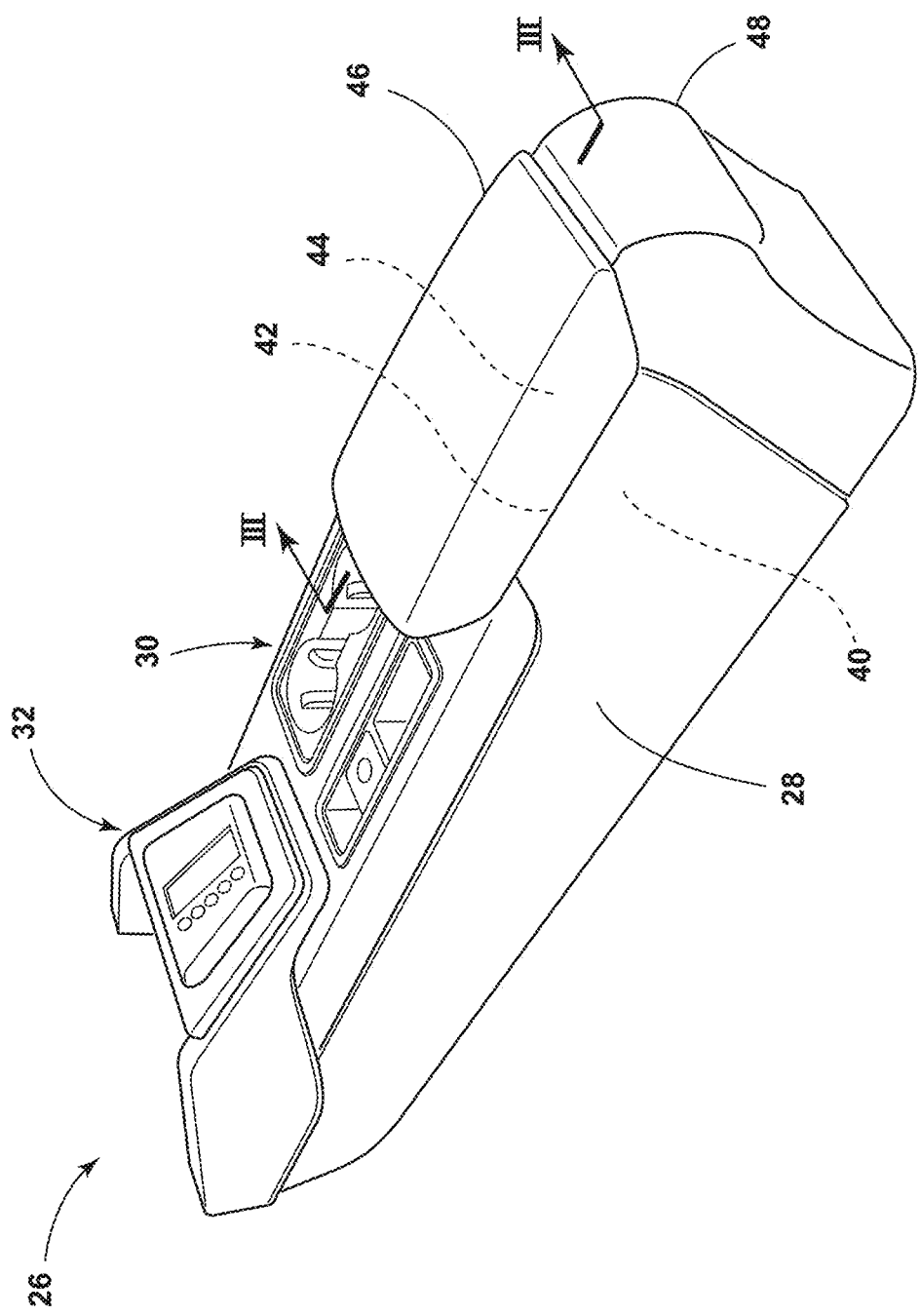
FIG. 2 is an enlarged perspective view of the vehicle floor console assembly.

Referring to FIG. 2, the console assembly 26 includes the console body 28, which may define a bin 40 for providing storage space to occupants of the vehicle 10 (FIG. 1). The console body 28 may include an upper rim 42 defining a bin opening 44, which may provide access to the bin 40. The bin opening 44 may define a substantially rectangular shape, which may correspond with a substantially rectangular cross-sectional shape of the console body 28. It is also contemplated that the console body 28 may have any practical shape. Additionally or alternatively, the cup holder assembly 30, shifter assembly 32, and/or the console body 28 may be any practicable size, depending on the vehicle 10. The console assembly 26 includes a lid 46. When in a lowered position, the lid 46 may rest upon and/or be supported by the upper rim 42 of the console body 28. In this way, the lid 46 may be disposed over the bin opening 44. The console assembly 26 also includes an end panel 48 attached to a rear portion of the console assembly 26.

Figure 3:
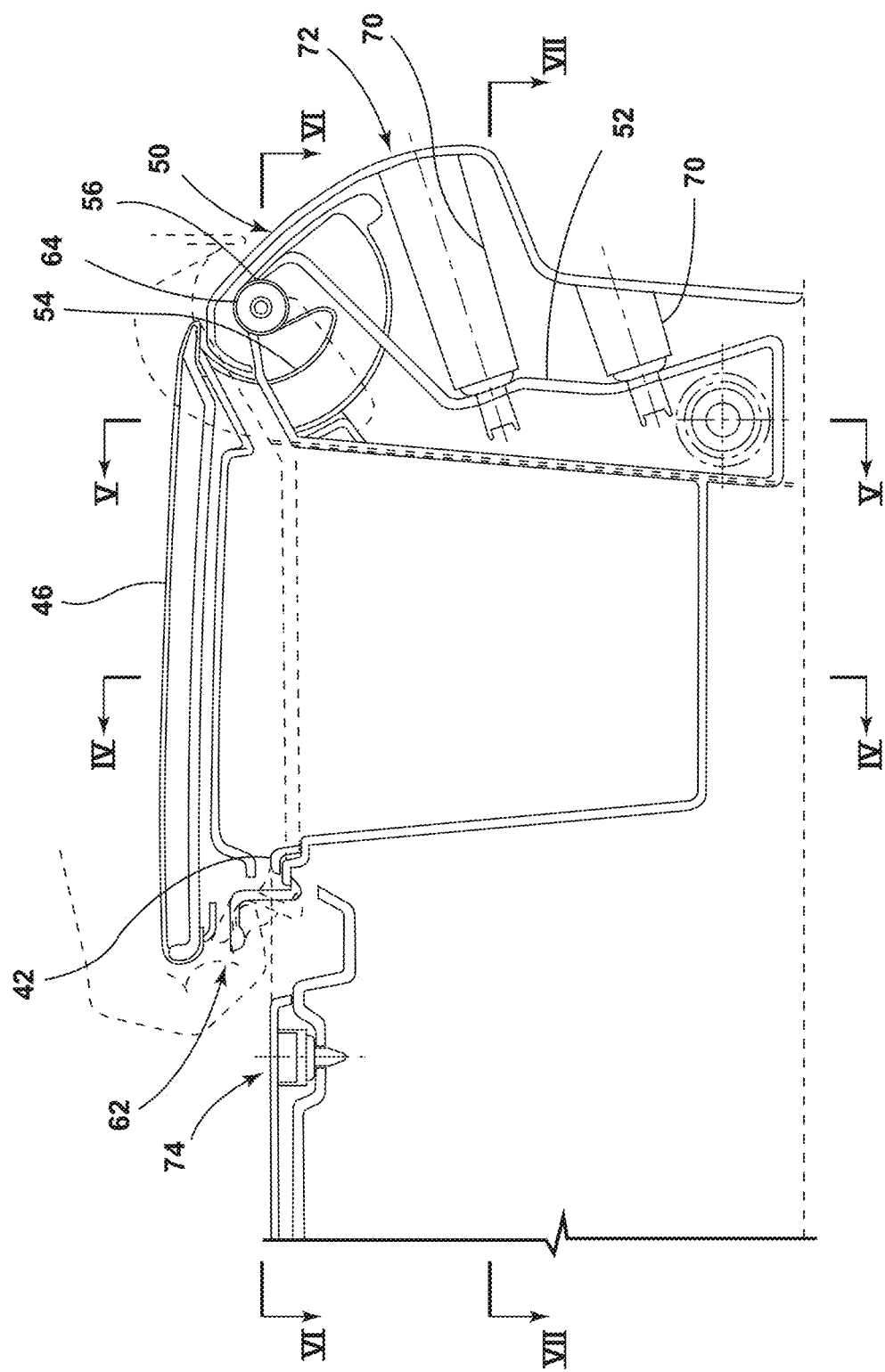
FIG. 3 is a cross-sectional view taken through line III-III of FIG. 2 of the vehicle floor console assembly.

Referring to FIG. 3, a side cross-sectional view is shown of the console assembly 26. In the shown example, the console assembly 26 includes the console body 28, the bin 40, the lid 46, a support structure 52 extending from a rearward surface of the bin 40, the end panel 48, the cup holder assembly 30, and the shifter assembly 32 (FIG. 2).

In various examples, a hinge portion 50 of the lid 46 may be coupled to the vehicle-rearward portion of the console body 28. This configuration may allow an occupant of the vehicle 10 to open the console assembly 26 from a vehicle-forward portion of the console assembly 26. In various examples, the hinge portion 50 includes a lid hinge 54 extending from a lower surface of the lid 46. In various aspects, the lid hinge 54 may be a substantially arcuate shape. The hinge portion 50 may include a lid hinge knuckle 56 extending radially inward from the lid hinge 54. The lid hinge 54 may also include a hinge stop 58 extending radially outward from the lid hinge 54. In various examples, the hinge stop 58 contacts an abutment feature 60 of the console body 28 when the lid 46 is in a raised position, as shown in phantom, to define a maximum angle between the bottom of the lower surface of the lid 46 and the upper rim 42 of the console body 28. According to various aspects, the console assembly 26 may include a latch assembly 62 for retaining the lid 46 in the lowered position. The occupant of the vehicle 10 may disengage the latch assembly 62 to rotate the lid 46 from the lowered position to the raised position.

The console body 28 may include a support structure 52 extending outward from the rearward portion of the console body 28. According to various examples, the support structure 52 includes a support hinge knuckle 64, at least one end panel attachment feature 66, and a floor attachment feature 68. According to various aspects, the support structure 52 may include a driver-side support structure 52A and a passenger-side support structure 52B each extending from the rearward portion of the console body 28. The driver-side support structure 52A and the passenger-side support structure 52B may be substantially mirror images of one another. Further, the driver-side support structure 52A and the passenger-side support structure 52B may be spaced-apart and arranged parallel to one another at the rearward portion of the console body 28. In various examples, the support structure 52 is formed with the bin 40 and the console body 28 as a single unitary piece.

In various examples, the end panel 48 is coupled to the support structure 52 by at least one end panel fastener 70. According to various examples, the end panel fastener 70 is an integral attachment (i.e. snap-fit) feature able to be coupled to the end panel attachment feature 66 of the support structure 52. However, it is contemplated that the end panel fastener 70 may be any practical fastener, such as, for example, bolts, adhesives, clamps, rivets, or any other similar fastening device. According to various aspects, the end panel 48 includes a hinge receiving portion 72 for housing at least a portion of the lid hinge 54. In the shown embodiment, the hinge receiving portion 72 is substantially arcuate for receiving the substantially arcuate lid hinge 54. However, it is contemplated that the hinge receiving portion 72 may be any practical shape for receiving a portion of the lid hinge 54. Additionally, it is contemplated that, in certain embodiments, the lid hinge receiving portion 72 may not receive any portion of the lid hinge 54 according to various designs.

In various examples, the cup holder assembly 30 and/or the shifter assembly 32 (FIG. 2) are formed separately from the console body 28. In such examples, the cup holder assembly 30 and/or the shifter assembly 32 (FIG. 2) may be coupled to the console body 28 by one or more trim attachment features 74. According to various examples, a trim attachment feature 74 is an integral attachment (i.e. snap-fit) feature. However, it is contemplated that the trim attachment feature 74 may be any practical fastener, such as, for example, bolts, adhesives, clamps, rivets, or any other similar fastening device.

Figure 4:
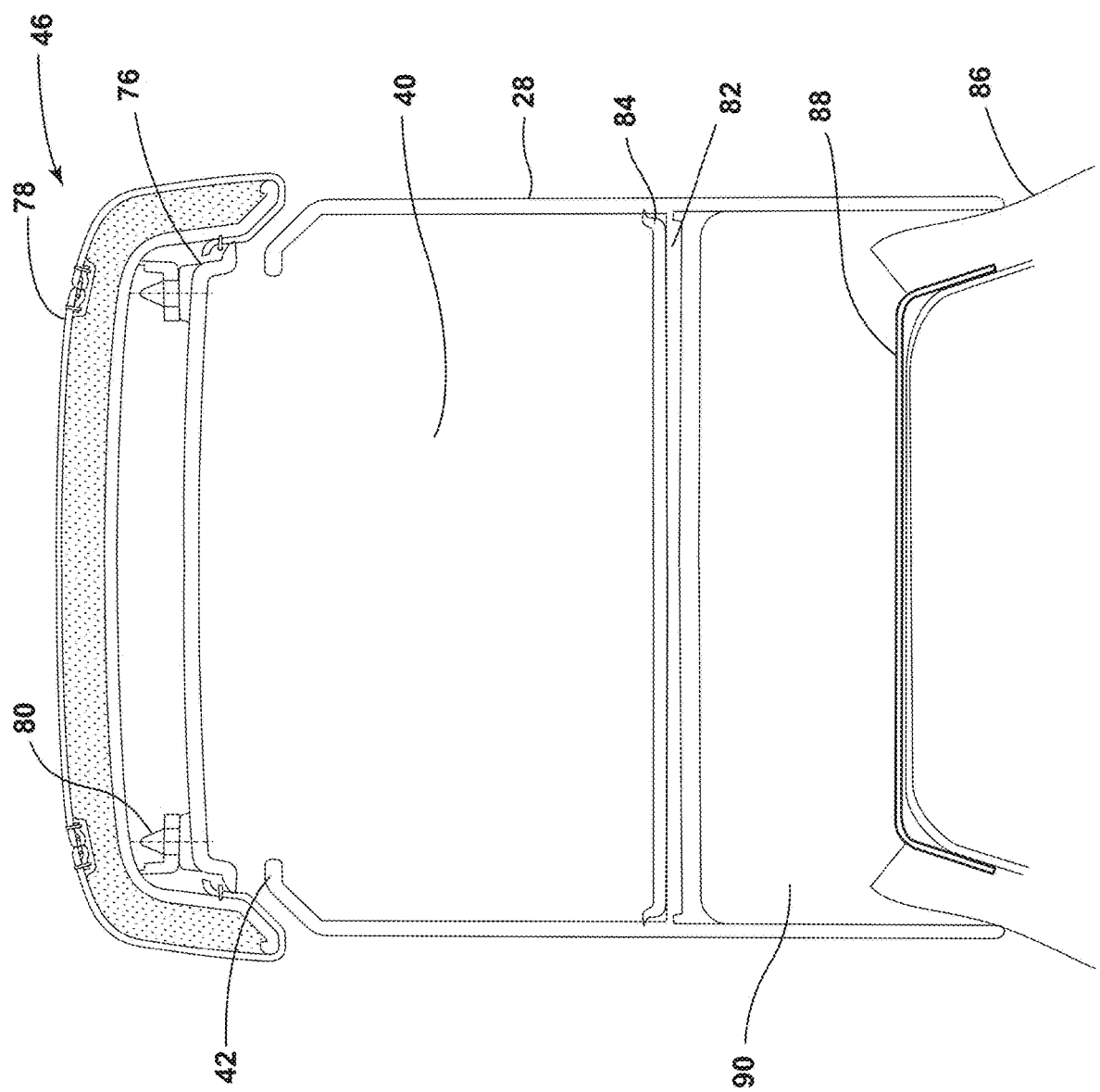
FIG. 4 is a cross-sectional view taken through line IV-IV of FIG. 3 showing a bin of a vehicle floor console assembly.

Referring now to FIG. 4, according to various aspects, the lid 46 may include a lid base 76 and a lid cover 78 coupled to the lid base 76. The lid cover 78 may be, for example, a padded layer, a cushion layer, and/or a decorative layer. This configuration may be advantageous for providing an armrest to the occupants of the vehicle 10 positioned within the driver seat 22 and/or the passenger seat 24 (FIG. 1). The lid 46 also includes one or more lid fasteners 80 for coupling the lid cover 78 to the lid base 76. According to various examples, one or more lid fasteners 80 are integral attachment (i.e. snap-fit) features. However, it is contemplated that the lid fasteners 80 may be any practical fasteners, such as, for example, bolts, adhesives, clamps, rivets, or other similar fastening devices. In various examples, the upper rim 42 of the console body 28 may be formed by inwardly extending sidewalls of the console body 28. The inwardly extending sidewalls of the console body 28 may fit within downwardly extending side edges of the lid 46.

According to various examples, the bin 40 is defined by the console body 28 such that the bin 40 is formed with the console body 28 as a single unitary piece. Included in the bin 40 is a bin floor 82 which defines a bottom surface of the bin 40 and may be integrally formed with the console body 28. In some examples, the bin 40 may also include a bin mat 84 positioned adjacent to the bin floor 82. In various aspects, the sidewalls of the console body 28 may extend downwardly to contact the vehicle flooring 86 of the vehicle 10. The vehicle flooring 86 may be carpet and is disposed on a floor pan 88 of the vehicle. In various aspects, the bin floor 82, the sidewalls of the console body 28, and the vehicle flooring 86 and/or floor pan 88 of the vehicle 10 may define a lower space 90 between the bin floor 82 and the floor pan 88. The lower space 90 may be sized appropriately for one or more structures to extend underneath the bin 40. For example, one or more wiring harnesses or heating ventilation and air conditioning (HVAC) ducts may extend under the bin 40 in the lower space 90. In other examples, the bin floor 82 may be positioned on the floor pan 88 of the vehicle 10 eliminating the lower space 90.

Figure 5A:
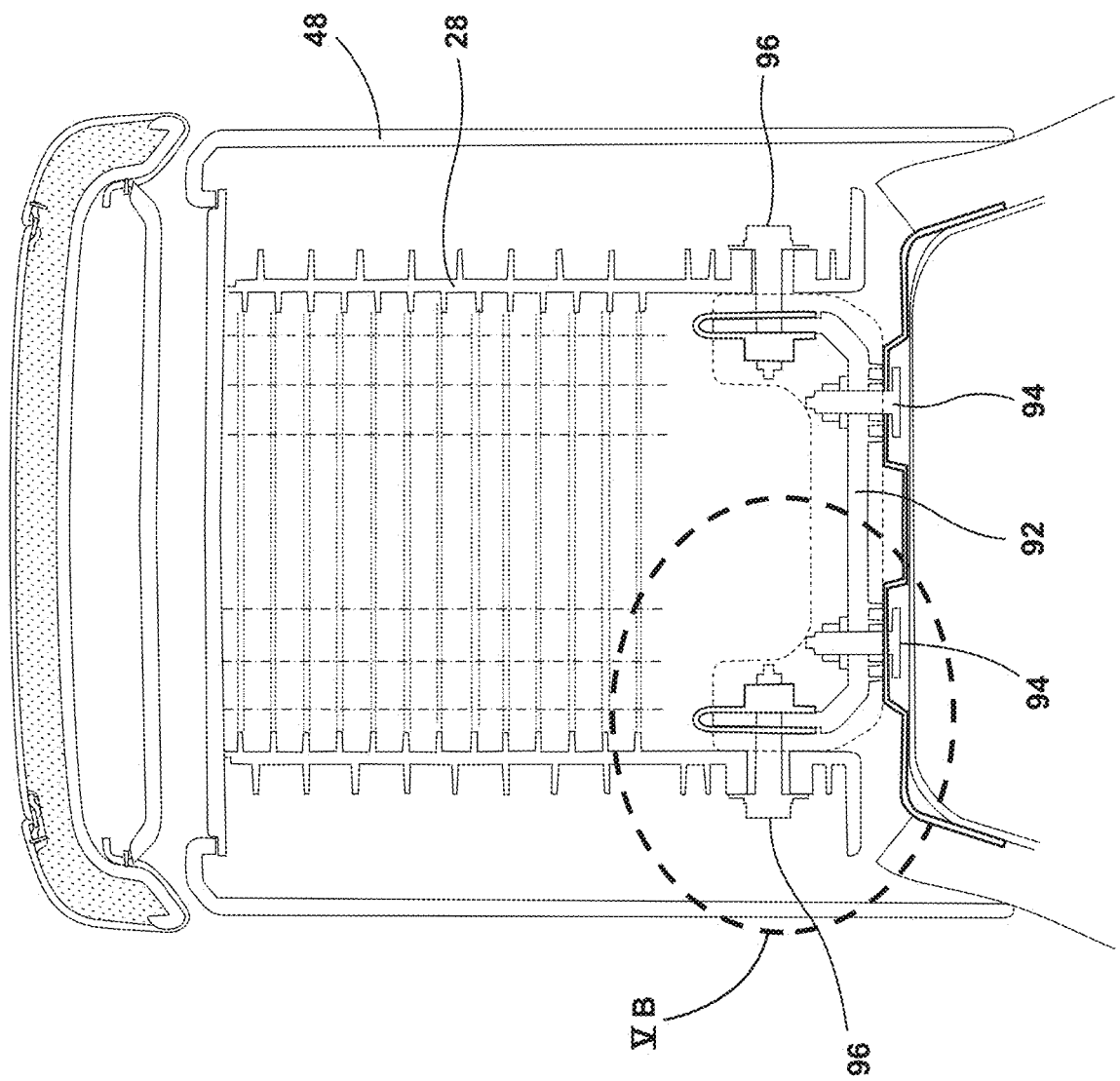
FIG. 5A is a cross-sectional view taken through line V-V of FIG. 3 showing a floor attachment feature of a vehicle floor console assembly.
Figure 5B:
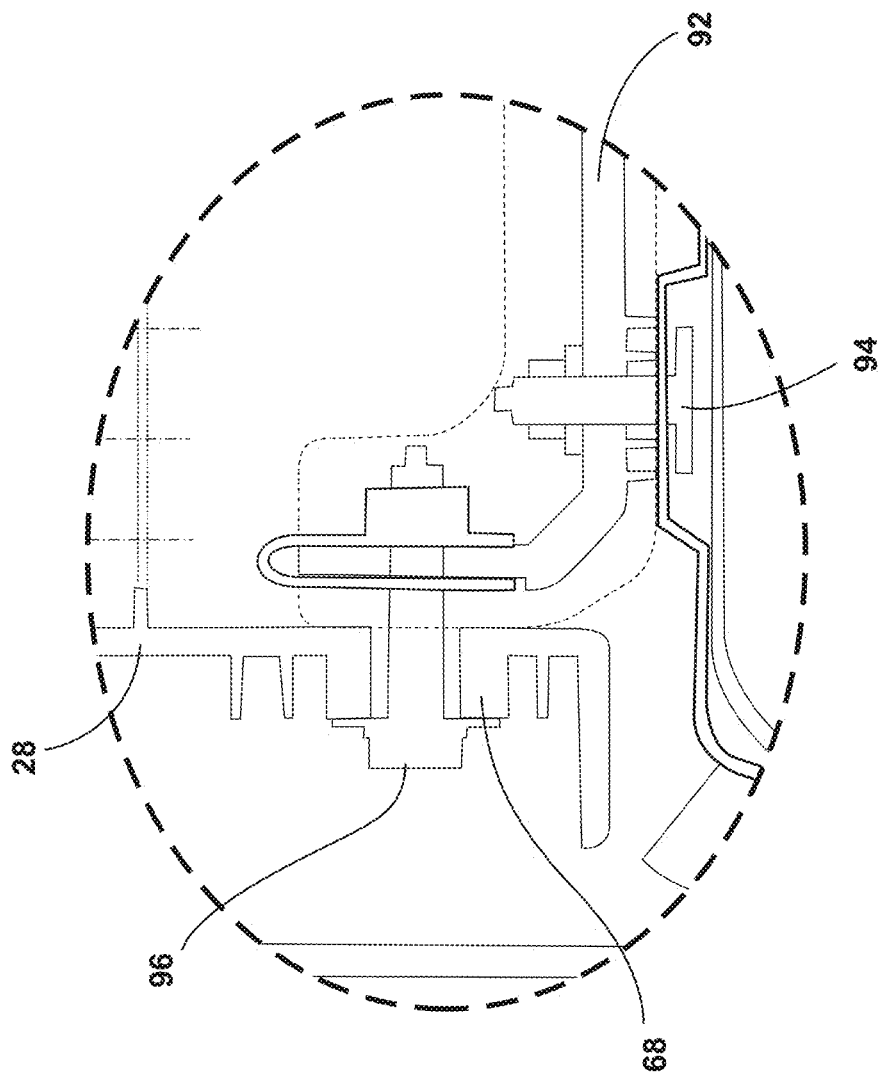
FIG. 5B is an enlarged cross-sectional view of section V B of FIG. 5A further showing the floor attachment feature of a vehicle floor console assembly.

Referring now to FIGS. 5A and 5B, the console body 28 is attached to the floor pan 88 of the vehicle 10 by a floor mounting bracket 92. The floor mounting bracket 92, as shown, is substantially U-shaped. This allows a passage in the lower space 90 to remain open for additional structures (e.g., HVAC ducts) to extend beneath the bin 40. The floor mounting bracket 92 includes floor panel fasteners 94 and console floor fasteners 96. The floor panel fasteners 94 are shown as a bolt and nut combination, however, any practical fastener assembly for fastening the floor mounting bracket 92 to the floor pan 88 is contemplated. According to some embodiments, the floor mounting bracket 92 may be welded to or integral to the floor pan 88. The console floor fasteners 96 couple the console body 28 via the floor attachment feature 68 of the support structure 52 to the floor mounting bracket 92. The console floor fasteners 96, as shown, are a bolt and threaded retaining clamp combination, however, any practical fastener, such as a rivet or integral attachment feature, for coupling the console body 28 to the floor mounting bracket 92 is contemplated.

Also shown in FIG. 5A is a portion of the end panel 48. The end panel 48 may include a curved upper-end panel portion in which forms an upper interface portion with the console body 28. As shown, the console body 28 may include an upper cutout portion for receiving the upper-end panel portion to form a smooth interface between the console body 28 and the end panel 48.

The console body 28 may be formed with one or more structural support ribs extending across one or more surfaces of the console body 28. The one or more structural support ribs help maintain the overall shape of the console body 28 and bin 40 and help to preserve the rigidity of the structure without requiring large amounts of materials. As shown, the one or more structural support ribs extend horizontally and vertically across the surfaces of the console body 28, however, any practical orientation is contemplated.

Figure 6A:
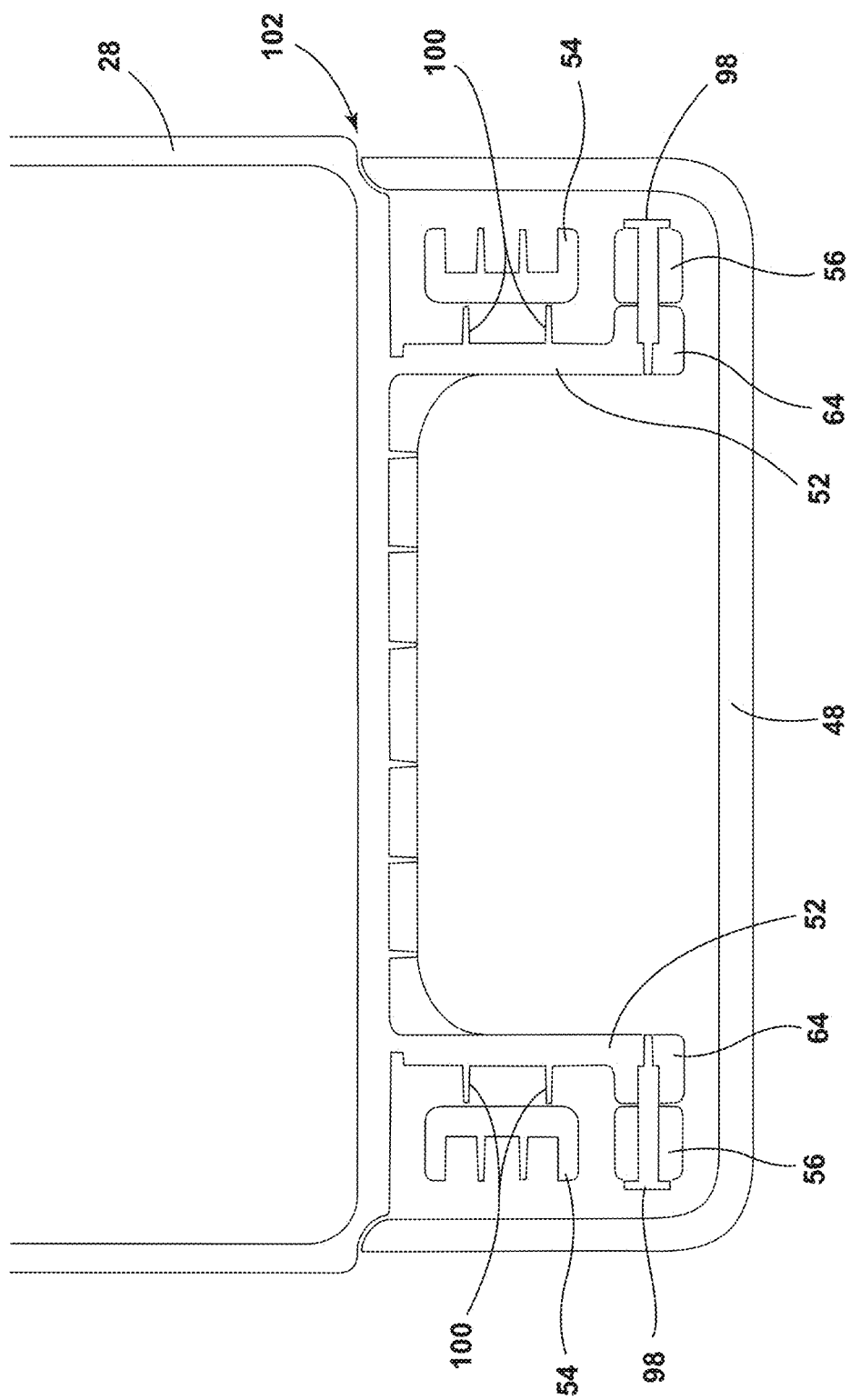
FIG. 6A is a top cross-sectional view of a support hinge knuckle of a vehicle floor console assembly.

Referring to FIG. 6A, in various examples, lid 46 (FIG. 3) and the console body 28 may be coupled via the support hinge knuckle 64 of the support structure 52 and the lid hinge knuckle 56 of the lid hinge 54 with one or more hinge pins 98. The hinge pin 98 may define a rotational axis of the lid 46. The lid hinge 54 may couple to the support hinge knuckle 64 in any practical manner which allows for rotation of the lid 46 relative to the console body 28, such as, for example, press-fitting, a partially threaded fastener, or the like. The support structure 52 may further include one or more hinge support structures 100. The hinge support structures 100, as shown, include one or more ribs extending from a sidewall of the support structure 52 proximal to the lid hinge 54 such that the hinge support structures 100 may help to maintain the lateral positioning of the lid hinge 54.

Figure 6B:
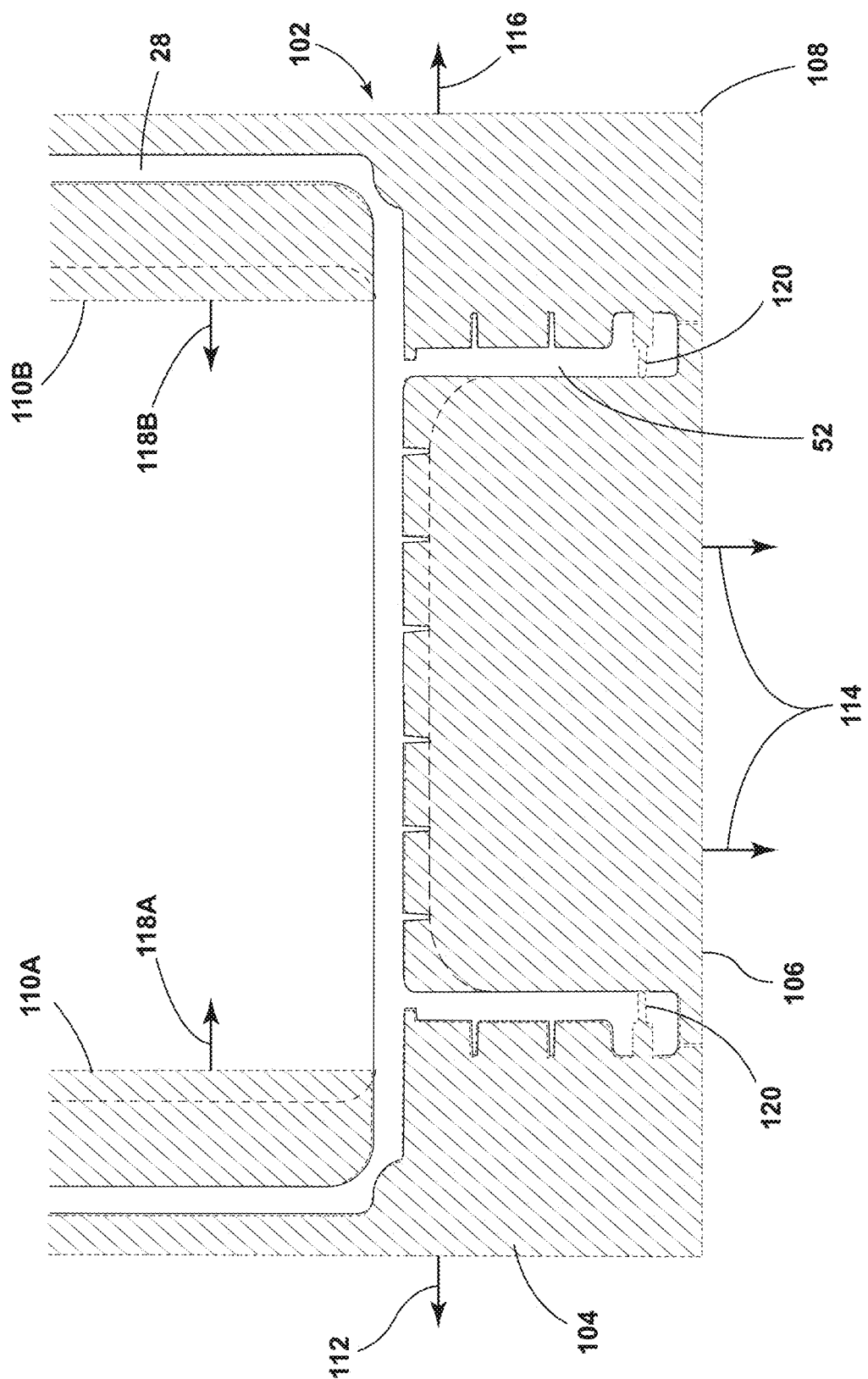
FIG. 6B is a top cross-sectional view of a support hinge knuckle of a console body including a plurality of mold parts of an injection molding apparatus in extended positions.
Figure 6C:
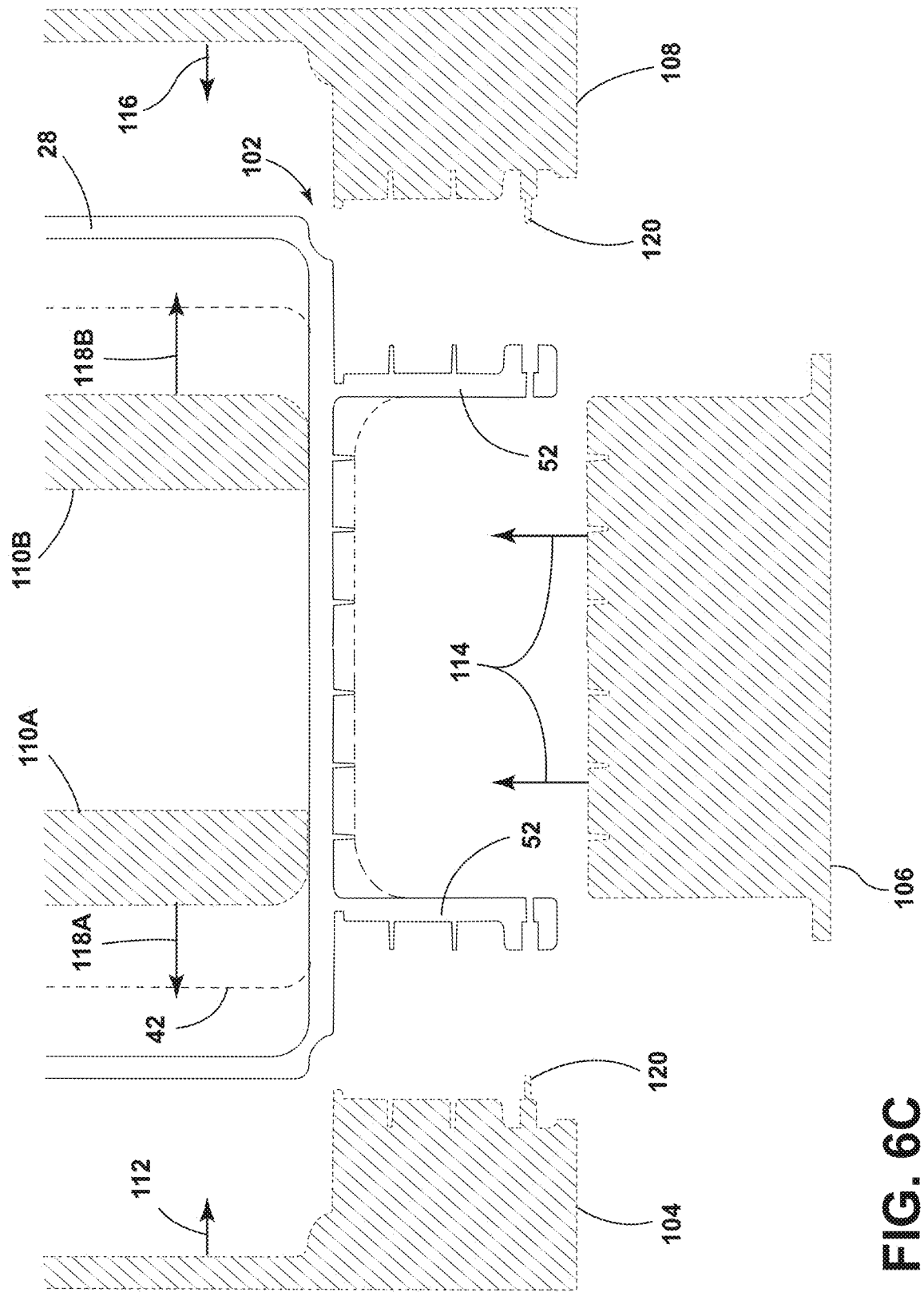
FIG. 6C is a top cross-sectional view of a support hinge knuckle of a console body including a plurality of mold parts of an injection molding apparatus in retracted positions.

Referring now to FIGS. 6A-6C, the console assembly 26 includes an end panel interface 102. The end panel interface 102 is defined by the interface between a front portion of the end panel 48 and the console body 28 in a longitudinal position (i.e. vehicle fore-and-aft position). As shown in FIG. 6A, the end panel interface 102 is substantially flush with a rear wall of the bin 40. In some aspects, the console body 28 and/or end panel 48 may include a cutout at the end panel interface 102 to help align the end panel 48 and the console body 28 to provide a better fit and more aesthetic appearance.

As shown in FIGS. 6B and 6C, the console body 28, bin 40, and support structure 52 are formed as a single unitary piece. In some aspects, a method of manufacturing the console body 28, bin 40, and support structure 52 includes forming the console body 28, bin 40, and support structure 52 with an injection molding apparatus including a plurality of mold parts 104-110B. According to some aspects, the plurality of mold parts 104-110B may include a driver-side mold part 104 having a driver-side mold travel direction 112, a rear mold part 106 having a rear mold travel direction 114, a passenger-side mold part 108 having a passenger-side mold travel direction 116, a left inner mold part 110A having a left inner mold travel direction 118A, and a right inner mold part 110B having a right inner mold travel direction 118B. The mold further includes a lower mold part (not shown) and an upper mold part (not shown). The left inner mold part 110A and the right inner mold part 110B may be supported by and travel with respect to the upper mold part.

When the mold parts 104-110B are in their respective extended positions (FIG. 6B) they are configured to receive a resin or other suitable material to form the console body 28 with the bin 40 and the support structure 52. After the resin hardens the mold parts 104-110B move in their respective travel directions 112-118B to their respective retracted positions (FIG. 6C) to release the console body 28. The left inner mold part 110A and the right inner mold part 110B move laterally from an extended position (as shown) inward as shown by travel directions 118A and 118B to provide clearance for the upper mold part to move past the inwardly extending upper rim 42 (FIG. 6C) as the console body 28 is removed from the mold. As shown in the current embodiment, the end panel interface 102 is flush with the rear wall of the bin 40 allowing the driver-side mold part 104 and the passenger-side mold part 108 to travel laterally to form the support structure 52. The end panel interface 102 may extend along substantially the entire length of the rear wall of the bin 40 such that the full support structure 52 may be defined by the interface of the rear mold part 106 and the driver-side mold part 104 and/or the passenger-side mold part 108.

The mold parts 104-110B may have one or more mold features (e.g., cutouts or protrusions) for forming each of the various features of the support structure 52. For example, each of the driver-side mold part 104 and the passenger-side mold part 108 may have a support knuckle protrusion 120 extending inwardly proximal to the rear mold part 106 to form an opening in the support hinge knuckle 64 for receiving a fastener. Additional mold part features are included for forming the complimentary features of the console body 28 (e.g., the hinge support structure 100, the end panel attachment feature 66, the floor attachment feature 68, and the one or more structural support ribs). It would be understood to a skilled artisan that these various features may vary according to the design of the console body 28.

Figure 7A:
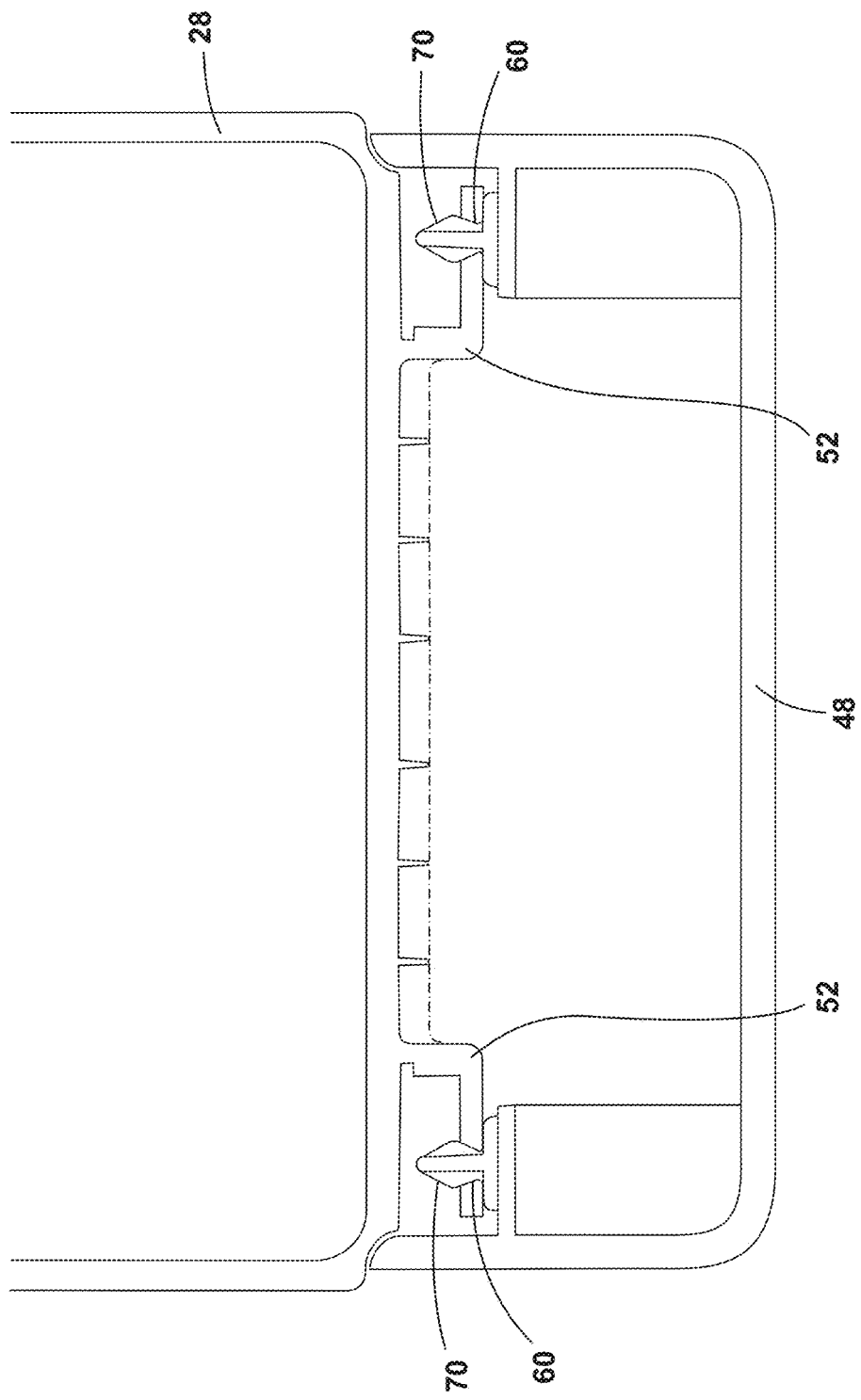
FIG. 7A is a top cross-sectional view of an end panel attachment feature of a vehicle floor console assembly.
Figure 7B:
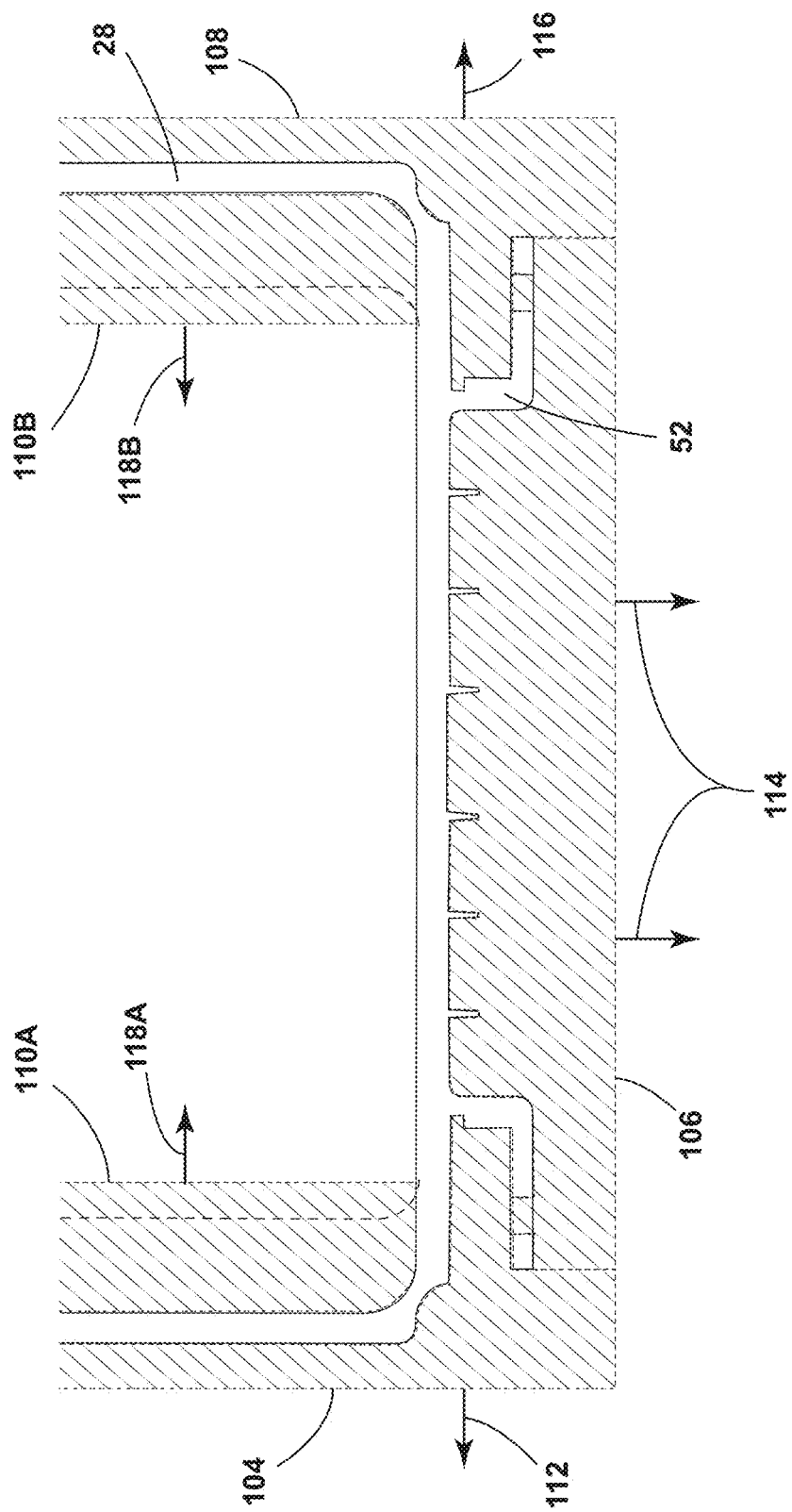
FIG. 7B is a top cross-sectional view of an end panel attachment feature of a console body including a plurality of mold parts of an injection molding apparatus in extended positions.
Figure 7C:
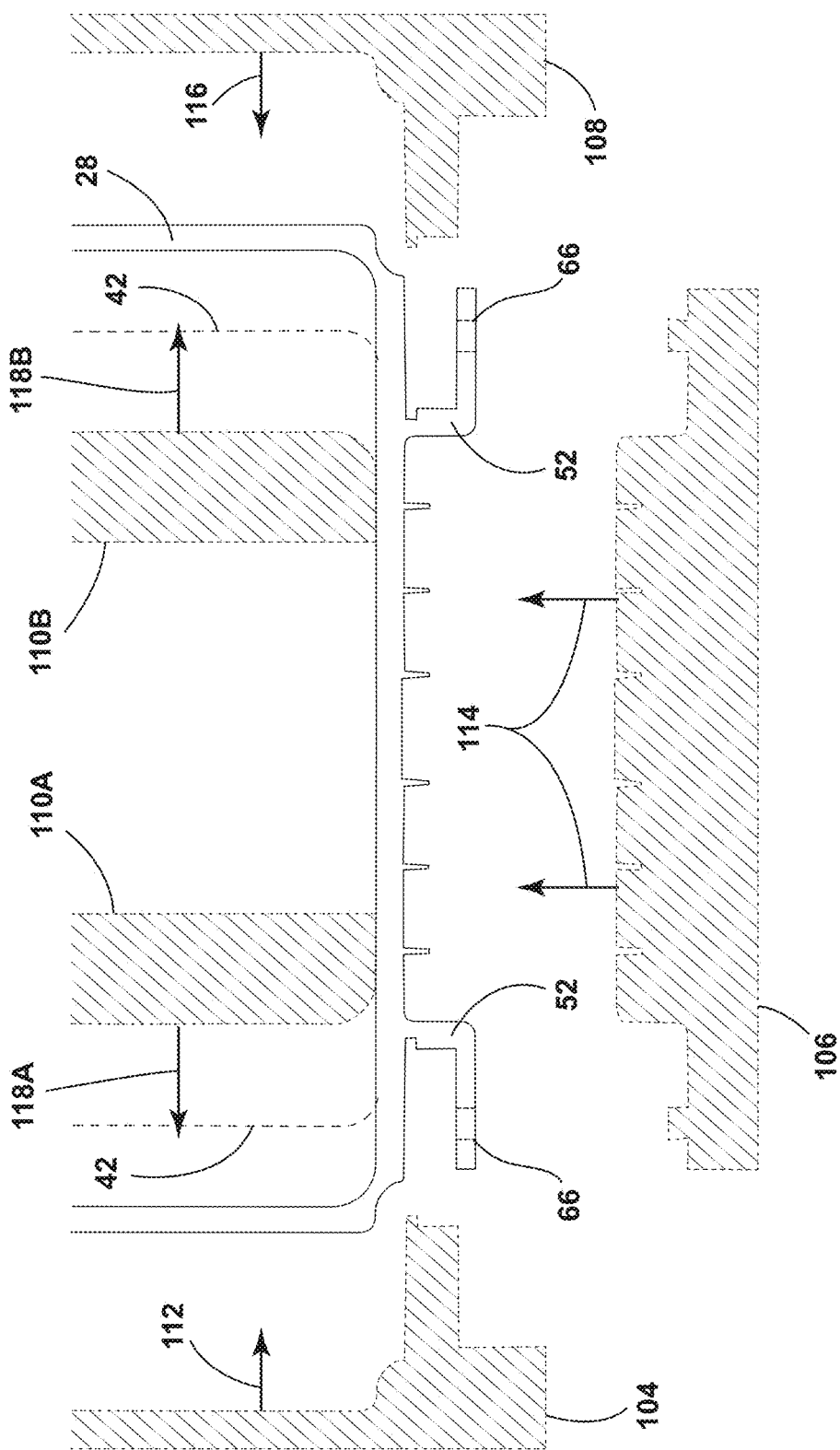
FIG. 7C is a top cross-sectional view of an end panel attachment feature of a console body including a plurality of mold parts of an injection molding apparatus in retracted positions.

Referring now to FIGS. 7A-7C, the support structure 52 of the console body 28 may include at least one end panel attachment feature 66 for coupling the end panel 48 to the support structure 52 by the at least one end panel fastener 70. As shown, the end panel attachment feature 66 comprises an L-shaped portion of the support structure 52 having an opening formed therein sized to receive the end panel fastener 70. In the present embodiment, the end panel fastener 70 is an integral attachment (i.e. snap-fit) feature coupled to the end panel 48 and able to extend through the end panel attachment feature 66 of the support structure 52. However, it is contemplated that the end panel fastener 70 and/or end panel attachment feature 66 may be any practical fastener combination, such as, for example, threaded fasteners, adhesives, clamps, rivets, or any other similar fastening device. The end panel attachment feature 66 may be integrally formed with the support structure 52 and defined by the interface between the rear mold part 106 and the driver-side mold part 104 and/or the passenger-side mold part 108.

Advantages of the current disclosure include the end panel interface 102 being substantially flush with the rear wall of the bin 40 such that the support structure 52 and associated attachment features, such as, for example, the support hinge knuckle 64, end panel attachment feature 66, floor attachment feature 68 and hinge support structure 100 may be integrally formed with the console body 28.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A vehicle floor console assembly comprising:
    a console body;
    a bin integrally formed with the console body; and
    a support structure integrally formed with the console body and extending from a rear wall of the bin, the support structure comprising a support hinge knuckle, an end panel attachment feature, and a floor attachment feature; and
    a floor bracket coupled to the floor attachment feature and further coupled to a floor panel of a vehicle.

2. The vehicle floor console assembly of claim 1, further comprising a lid, the lid comprising a lid hinge and a lid hinge knuckle, wherein the lid hinge knuckle is rotatably coupled to the support hinge knuckle.

3. The vehicle floor console assembly of claim 2, wherein the lid hinge comprises an arcuate shape, and wherein the lid hinge comprises a stop protruding radially outward from an edge of the hinge.

4. The vehicle floor console assembly of claim 3, wherein the console body further comprises an abutment integrally formed with the console body and extending from the rear wall of the bin configured to contact the stop of the lid hinge when the lid is in a fully opened position.

5. The vehicle floor console assembly of claim 1, further comprising an end panel coupled to the end panel attachment feature.

6. The vehicle floor console assembly of claim 5, wherein a front portion of the end panel and the console body define an end panel interface, and wherein the end panel interface is substantially flush with the rear wall of the bin.

7. The vehicle floor console assembly of claim 1, wherein the floor bracket comprises a U-shape and, together with a bottom surface of the bin, defines a lower space.

8. The vehicle floor console assembly of claim 7, wherein the lower space is sized to receive an HVAC duct.

9. The vehicle floor console assembly of claim 2, wherein the console body comprises one or more inwardly extending side edges configured to fit within one or more downwardly extending side edges of the lid.

10. A vehicle floor console assembly comprising:
    a console body comprising:
        a bin integrally formed with the console body; and
        a support structure integrally formed with the console body and extending from a rear wall of the bin, wherein the support structure comprises a support hinge knuckle;
    a lid comprising a lid hinge knuckle rotatably coupled to the support hinge knuckle;
    an end panel coupled to the console body, wherein a front portion of the end panel, together with the console body, defines an end panel interface, and wherein the end panel interface is substantially flush with the rear wall of the bin; and
    a floor bracket coupled to a floor attachment feature of support structure and further coupled to a floor pan of a vehicle.

11. The vehicle floor console assembly of claim 10, wherein the lid comprises a lid hinge having an arcuate shape, wherein the lid hinge comprises a stop protruding radially outward from an edge of the lid hinge.

12. The vehicle floor console assembly of claim 11, wherein the console body further comprises an abutment integrally formed with the console body and extending from the rear wall of the bin configured to contact the stop of the lid hinge when the lid is in a fully opened position.

13. The vehicle floor console assembly of claim 10, wherein the floor bracket comprises a U-shape and, together with a bottom surface of the bin, defines a lower space, wherein the lower space sized to receive an HVAC duct.

14. A method for manufacturing a vehicle floor console assembly comprising:
    providing an injection molding apparatus comprising:
        a driver-side mold part;
        a passenger-side mold part; and
        a rear mold part;
    injecting a plastic resin into the injection molding apparatus to form an integral console body comprising an integrally formed bin and an integrally formed support structure extending from a rear wall of the bin, wherein the driver-side mold part, the passenger-side mold part, and the rear mold part together define the support structure; and
    removing the integral console body from the injection molding apparatus.

15. The method of claim 14, wherein the support structure comprises a support hinge knuckle, an end panel attachment feature, and a floor attachment feature.

16. The method of claim 15, further comprising:
    providing a lid comprising a lid hinge and a lid hinge knuckle; and
    coupling the lid hinge knuckle to the support hinge knuckle.

17. The method of claim 15, further comprising coupling an end panel to the end panel attachment feature.

18. The method of claim 15, further comprising coupling the floor attachment feature of the support structure to a floor pan of a vehicle.

* * * * *